United States Patent [19]

Abraham et al.

[11] 4,228,491
[45] Oct. 14, 1980

[54] CONTROL METHOD FOR A THREE-PHASE SELF-EXCITED INVERTER

[75] Inventors: Ludwig Abraham, Mannheim; Armando Moschetti, Lampertheim, both of Fed. Rep. of Germany

[73] Assignee: Brown, Boveri & Cie Aktiengesellschaft, Mannheim, Fed. Rep. of Germany

[21] Appl. No.: 954,833

[22] Filed: Oct. 26, 1978

[30] Foreign Application Priority Data

Oct. 26, 1977 [DE] Fed. Rep. of Germany ....... 2747964

[51] Int. Cl.² .............................................. H02M 1/14
[52] U.S. Cl. ..................................................... 363/41
[58] Field of Search .................... 363/41, 97, 137, 138

[56] References Cited

U.S. PATENT DOCUMENTS

| | | | |
|---|---|---|---|
| 3,710,229 | 1/1973 | Jessee | 363/41 |
| 3,820,003 | 6/1974 | Tappeiner et al. | 363/41 |
| 3,916,285 | 10/1975 | Iwata et al. | 363/41 |
| 3,958,171 | 5/1976 | Sekino | 363/41 |

OTHER PUBLICATIONS

Patel et al., "Generalized Techniques of Harmonic Elimination in Voltage Control in Thyristor Inverters: Part I-Harmonic Elimination", IEEE Transactions on Industry Applications, vol. IA-9, No. 3, May/Jun. 1973.
Patel et al., "Generalized Techniques of Harmonic Elimination in Voltage Control in Thyristor Inverters: Part II-Voltage Control Techniques", IEEE Transactions on Industry Applications, vol. IA-10, No. 5, Sep.-/Oct. 1974.
Lienav et al., "Mögoichkeiten, etc. "ETZ-A, Band 97, (1976, H.11, pp. 663-667).
Vandenboom et al., BBC Reprint "BBC Converter Techniques for Drives", Apr. 1970, Article 2.
Schonung et al., BBC Reprint "BBC Converter Techniques for Drives", Apr. 1970, Article 3.
Dewan et al., "Harmonic Analysis of a Synchronized Pulse Width-Modulated Three-Phase Inverter", IEEE Transactions on Industry Applications, vol. IA-10, No. 1, Jan./Feb. 1974.

*Primary Examiner*—William M. Shoop
*Attorney, Agent, or Firm*—Oblon, Fisher, Spivak, McClelland & Maier

[57] ABSTRACT

A control method for a three-phase self-excited inverter which is fed from a dc voltage source and in which the fundamental oscillation of the output voltage is adjustable in frequency and amplitude, in particular by the subharmonic method, and wherein the pulsing or timing is always done in only one of three phases (R, S or T) such that 60°-wide pulse regions are arranged symmetric to the maximum and minimum of the fundamental voltage oscillation of each phase (R, S or T) and overlap each fundamental voltage oscillation.

2 Claims, 4 Drawing Figures

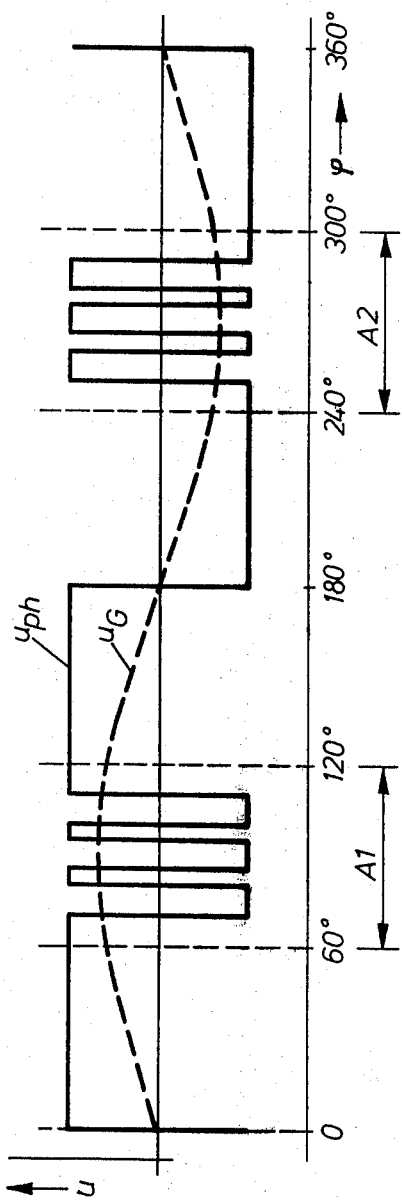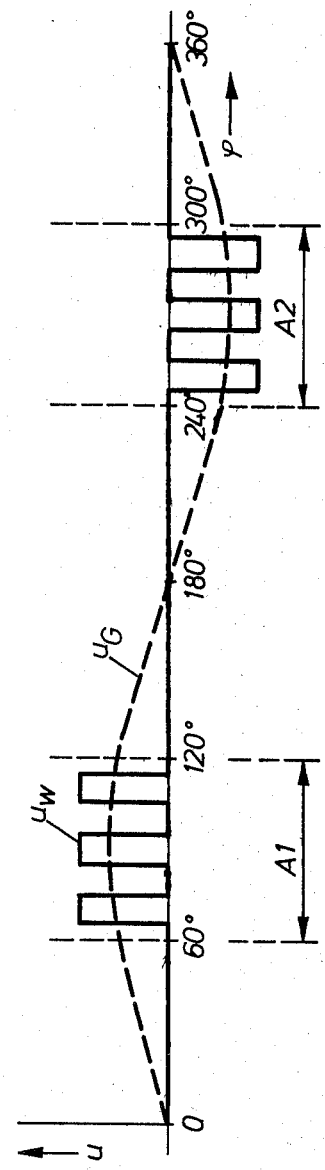

CONTROL METHOD FOR A THREE-PHASE SELF-EXCITED INVERTER

BACKGROUND OF THE INVENTION

1. Field of the Invention

This invention relates to a control method for a three-phase self-excited inverter, which is fed from a dc voltage source, commutated on the dc side, and in which the fundamental oscillation of the output voltage is adjustable in frequency and amplitude by means of pulsewidth modulation. The invention finds application in rectifier-fed drives, particularly in vehicles on rails. Also, it is understood that the "dc voltage source" feeding the inverter can be an intermediate dc voltage circuit of a converter such as, e.g., one converting a single-phase ac voltage into three-phase ac.

2. Description of the Prior Art

In the known methods for control of inverters by the subharmonic method, two different types can be distinguished, as now described.

In a first known method, the switching points of the inverter phases are derived from the intersections of a sinusoidal, rectangular or trapezoidal reference voltage and a triangular voltage of higher frequency (See BBC reprint "BBC Converter Technique for Drives", April 1970, Article 3, pp. 23 to 25 (Order No. GIA 60275), and also Article 2 of this publication, as well as BBC reprint from the Brown, Boveri Mitteilungen of January 1973, vol. 60, "The Development of Different Control Techniques of the Subharmonic Method Over Inverter Output Voltage" (Publication Order No. D ZEK 30388 D), 11 pp). The reference voltage there described may or may not be synchronized with the triangular voltage. The phase voltages may not only be changed between positive and negative polarities of a voltage but may assume, besides a zero value, two different voltage amplitudes of both polarities (first cited BBC reprint, Art. 3, FIGS. 3 and 4). Thereby the harmonics can be considerably reduced by simple control measures, which are called for when the component inverters used for the separate phases in the known case are reproducibly switched. The corresponding switching times of the inverter are determined by the superposition of the aforementioned voltages. Fundamental frequency and amplitude of the three-phase output voltage of the inverter are thereby given by the reference voltages, while the timing frequency is determined by the triangular voltage. One thus proceeds from a fixed frequency of the triangular voltage and the, e.g. sinusoidal, reference is varied. The result, therefore, is that the position of the switching time within the positive or negative half-cycle of the inverter voltage phase is not limited to a specific region of the half-cycle. Accordingly, this approach is characterized by what is called "free timing".

In another known method the switching times of the inverter voltage phase are so located that one or more harmonics do not appear (Journal "ELEKTRIE" 29 (1975) No. 1, pp. 35 to 37; IEEE Transactions on Industrial Applications, Vol. Ia-10, No. 1, January/February 1974, pp. 117 to 122; ETZ-A, Vol. 93 (1972), No. 9, pp. 528 to 530; IEEE Transactions on Industrial Applications, Vol. Ia-9, No. 3, May/June 1973, pp. 310 to 317 as well as No. 5, September/October 1974, pp. 666 to 673). In this known control method the position of the switching angle (i.e. the pulses of the inverter voltage) depends on the harmonics eliminated.

The same holds for still another known method in which there are always impressed on a 120° block of a given phase missing current blocks from the other otherwise currentless phases of the machine, which occurs cyclically for all 120° blocks of all phases. This current block of 120 electrical degrees duration is divided into separate blocks symmetric about the center line thereof. The minimum width of the undivided mean current block is 60 electrical degrees (ETZ-A, Vol. 9, (1976), No. 11, pp. 663 to 667 and DT-OS No. 2 531 255).

In the first mentioned type of method with "free timing", relatively many switching per phase are to be preferred. In the second type, a relatively costly control arrangement results in case variation of the harmonics to be eliminated is desired.

In yet another known method, as disclosed in U.S. Pat. No. 3,916,285 to Iwata et al, a set of timed gate pulse series for control of a pulse width modulated thyrister inverter is generated through the steps of generating three phased series of triangular waveform signals, the repetition frequencies of which are proportional to the level of an input command and which have a ratio therebetween of 4:2:1. The triangular waveform signals are level-compared with an input command, and on the basis of the crossover points therebetween, three series of pulses are generated having a pulse width ratio therebetween of 1:2:4. Then, depending upon the level of the input command, one of the three series of generated pulses is selected and converted to a set of desired time gate pulse series for control of the thyristor inverter. In the case where a three-phase pulse width modulated thyristor inverter is controlled, three desired sets of gate pulse series having a phase shift of 120° therebetween is derived as the final step of the conversion of the series of pulses produced by the crossover comparisons.

SUMMARY OF THE INVENTION

Accordingly, it is one object of this invention, starting from the above described control method, to reduce the harmonics of the inverter output voltage and the number of switchings required.

This and other objects are achieved according to the invention by always pulsing or timing only in one phase R, S or T and thereby arranging two 60° wide (electrical °) pulse regions symmetric to the maximum and minimum of the fundamental voltage oscillation of each phase R, S or T and overlapping them, where R, S or T are the usual phase designations of a three-phase system.

The 120° (electrical) wide current blocks of the other phases remain undivided here.

Preferably, as also in the above described known case, different timing ratios between the timing frequency and the frequency of the fundamental voltage oscillation are used for different operating regions. According to the invention, the switching between two timing ratios is done here at the beginning and end of the 60° wide pulse region of each phase, where "timing ratio" is understood to be the ratio of the mean frequency of the switchings per phase to the fundamental frequency, i.e. the frequency of the fundamental voltage oscillation. It corresponds to half the number of switchings in a phase per period.

Thus, the method of the invention specifically reduces the harmonics in comparison with the previously described control methods at the same timing ratio. Furthermore, the switching times in the method of the invention are firmly fixed by control characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a graph illustrating the principal features of a phase potential $u_{ph}$, for denoting the regions in which pulsing is done and the position of the fundamental $u_G$ to be approximated for a single-pulse circuit, FIG. 2 is a graph illustrating the principal features of the inverter voltage $u_w$ for denoting the regions of pulsing as well as the position of the fundamental $u_G$ to be approximated for a multipulse circuit;

DETAILED DESCRIPTION OF THE PREFERRED EMBODIMENTS

Figure 3:
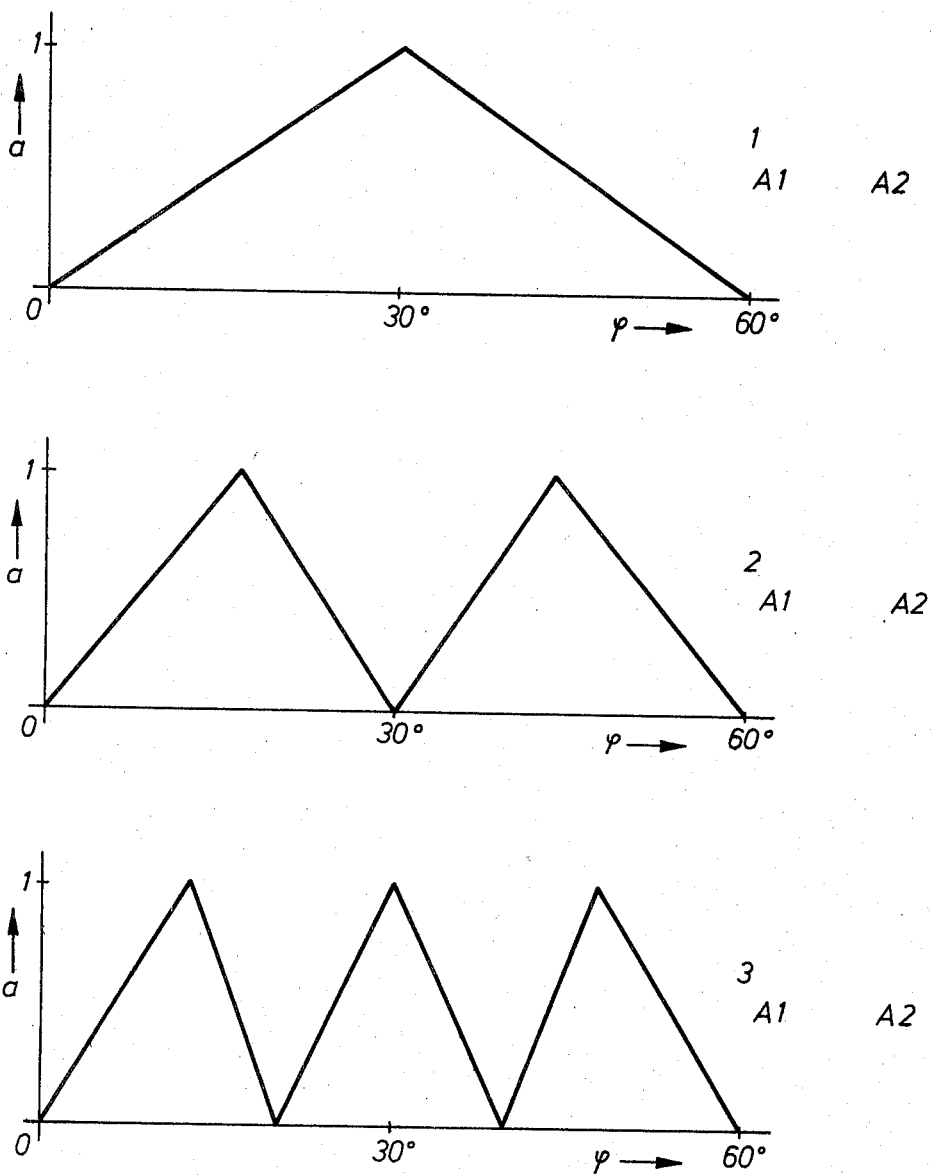
FIG. 3 is a graph illustrating control characteristics for inverters with two possible output-voltage conditions.

Referring now to the drawings, wherein like reference numerals designate identical or corresponding parts throughout the several views, and more particularly to FIG. 1 thereof, it is firstly noted that the designation A1 denotes the pulsing region in the positive half-cycle and A2 denotes the corresponding pulsing region in the negative half-cycle.

According to FIG. 1 switching is done between a positive and a negative voltage value for a 60° (electrical) region by means of a single-pulse circuit. This can be realized, e.g. by means of the blocking voltage-free circuit for one phase given in the cited BBC reprint, Article 2, FIG. 5, which can be extended, of course, to three phases. To determine the switching times, a control characteristic symmetric about the 90° or 270° points of the individual phases (FIG. 3) is compared with the corresponding reference voltage.

Figure 4:
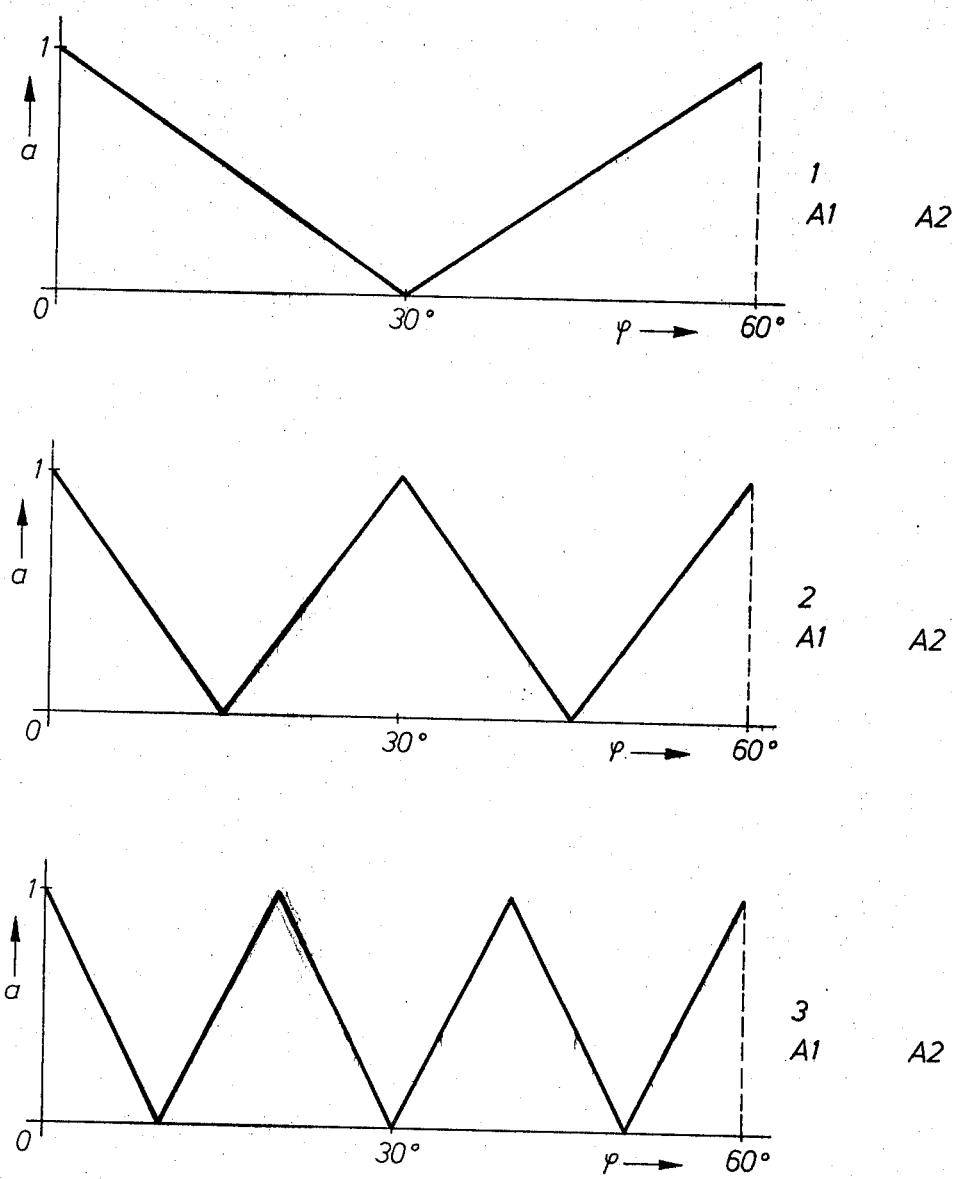
FIG. 4 is a graph illustrating control characteristics for inverters with three possible output-voltage conditions.

The control method according to FIG. 2 holds for compound pulsed inverters (multipulse circuit) and can be realized, e.g. with a circuit from the cited BBC reprint, Article 3, FIG. 4. The switching times are determined by the comparison of a control characteristic symmetric about the 90° or 270° points of the resulting voltage $u_w$ (FIG. 4) with the corresponding reference voltages. Here, switching is between a positive voltage, zero voltage and a negative voltage.

It is further noted that the circuit shown in FIG. 5 of the above referenced U.S. Pat. No. 3,916,285 to Iwata et al is also suitable for the implementation of the present invention simply by substituting the triangular waveform shown in FIGS. 3 and 4 of this Application for the waveform shown in FIGS. 3 and 4 of the Iwata et al disclosure, and by selecting reference comparison voltages for comparison with the respective triangular waveforms shown in FIGS. 3 and 4 of the present Application to derive a control characteristic symmetric about the 90° or 270° points of the individual phases.

FIGS. 1 and 2 relate to the case of three break-ins and three pulses, respectively, in the 60° (electrical) regions A1 and A2, to which correspond the bottom control characteristics of FIG. 3 and FIG. 4, respectively.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a control method for a three-phase self-excited inverter which is fed from a DC voltage source and in which the fundamental oscillation of the output voltage is adjustable in frequency and amplitude, in particular by the subharmonic method, the improvement comprising:

generating three phased series of triangular waveform signals of the same amplitude and having repetition frequencies bearing predetermined relationships;

generating an input command signal having an amplitude variable between predetermined limits;

level comparing selected of the triangular waveform signals with said input command signal;

generating sequentially non-overlapping respective series of gate pulse signals for initiating switching of an inverter coupled to a respective phase (R, S or T), the gate pulse signals for a respective phase being generated only in two 60° (electrical)-wide operating pulse regions arranged symmetric to the maximum and minimum of the fundamental voltage oscillation of said respective phase (R, S or T) and such that said 60° (electrical)-wide pulse regions overlap the fundamental voltage oscillation of each respective phase.

2. A control method as in claim 1, in which different timing ratios between the frequency of respective gate pulse signals and the frequency of the fundamental voltage oscillation are used for different operating regions, further comprising:

switching between two timing ratios at the beginning and at the end of the 60° (electrical)-wide pulse region.

* * * * *